(12) United States Patent
Nakano

(10) Patent No.: US 7,533,275 B2
(45) Date of Patent: May 12, 2009

(54) DATA PROCESSING APPARATUS AND MEMORY CARD USING THE SAME

(75) Inventor: Hiroo Nakano, Atsugi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1507 days.

(21) Appl. No.: 10/026,813

(22) Filed: Dec. 27, 2001

(65) Prior Publication Data

US 2002/0084333 A1  Jul. 4, 2002

(30) Foreign Application Priority Data

Dec. 28, 2000 (JP) ............................. 2000-400828

(51) Int. Cl.
  G06F 12/14  (2006.01)
(52) U.S. Cl. .................................. 713/193
(58) Field of Classification Search ............... 235/380, 235/492; 713/193–201
  See application file for complete search history.

(56) References Cited

U.S. PATENT DOCUMENTS

| | | | |
|---|---|---|---|
| 4,932,053 A | | 6/1990 | Fruhauf et al. |
| 5,117,380 A | * | 5/1992 | Tanagawa ................ 708/251 |
| 6,327,661 B1 | * | 12/2001 | Kocher et al. ............. 713/193 |
| 6,419,159 B1 | * | 7/2002 | Odinak .................... 235/492 |
| 6,698,662 B1 | * | 3/2004 | Feyt et al. ................. 235/492 |
| 6,839,847 B1 | * | 1/2005 | Ohki et al. ................ 713/194 |
| 6,839,849 B1 | * | 1/2005 | Ugon et al. ............... 713/200 |
| 6,848,619 B1 | * | 2/2005 | Leydier ..................... 235/492 |
| 2004/0039931 A1 | * | 2/2004 | Dabbous et al. ........... 713/194 |

FOREIGN PATENT DOCUMENTS

| | | |
|---|---|---|
| FR | 2 776 410 | 9/1999 |
| FR | 2 787 900 | 6/2000 |
| FR | 2 793 904 | 11/2000 |
| GB | 2 119 978 | 11/1983 |
| JP | 8-249239 | 9/1996 |
| JP | 9-26917 | 1/1997 |
| JP | 2000-504137 | 4/2000 |
| JP | 2000-285094 | 10/2000 |
| KR | 2000-0049114 | 7/2000 |
| WO | WO 00/26746 | 5/2000 |

OTHER PUBLICATIONS

Scheier, B., Applied Cryptography, 1996, 2nd Edition, P197-206 and P372-375.*
Kömmerling, O., Design Principles for Tamper-Resistant Smartcard Processors, 1999, USENIX.*
Data Book Soft Microcontroller, pp. 1-3,7,8,73,77-80,82,152-156,229,290-292,XP-002053731, "Section 1: Introduction", Oct. 6, 1993.

* cited by examiner

*Primary Examiner*—Brandon S Hoffman
(74) *Attorney, Agent, or Firm*—Oblon, Spivak, McClelland, Maier & Neustadt, P.C.

(57) ABSTRACT

A CPU and a memory are connected to each other through an address bus, a data bus, a read signal line and a write signal line. A read control signal and a write control signal transferred to the read signal line and the write signal line, respectively, are supplied to a control signal generating circuit. The control signal generating circuit detects a change in the read control signal and the write control signal transmitted to the read signal line and the write signal line, respectively, and then generates a control signal. The control signal generated by the control signal generating circuit is supplied to a pseudo-data generating circuit. The pseudo-data generating circuit generates pseudo-data comprising any random number data in accordance with the control signal and outputs the pseudo-data onto the data bus.

22 Claims, 5 Drawing Sheets

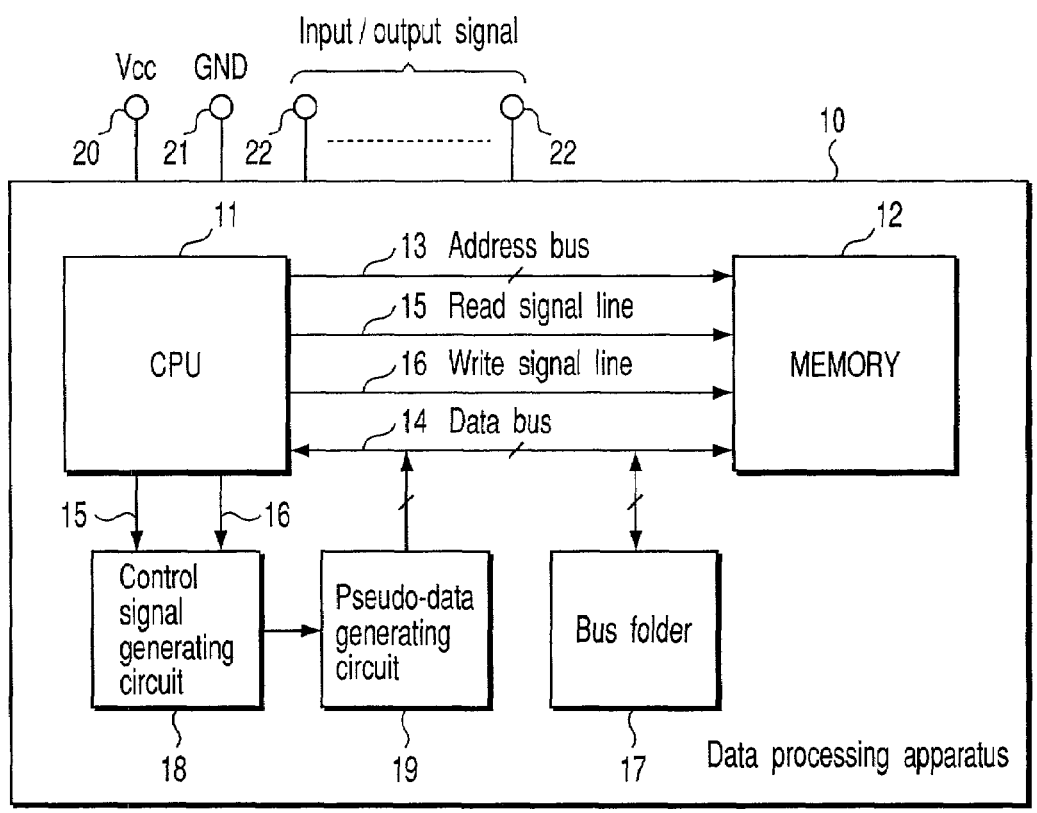
F I G. 1
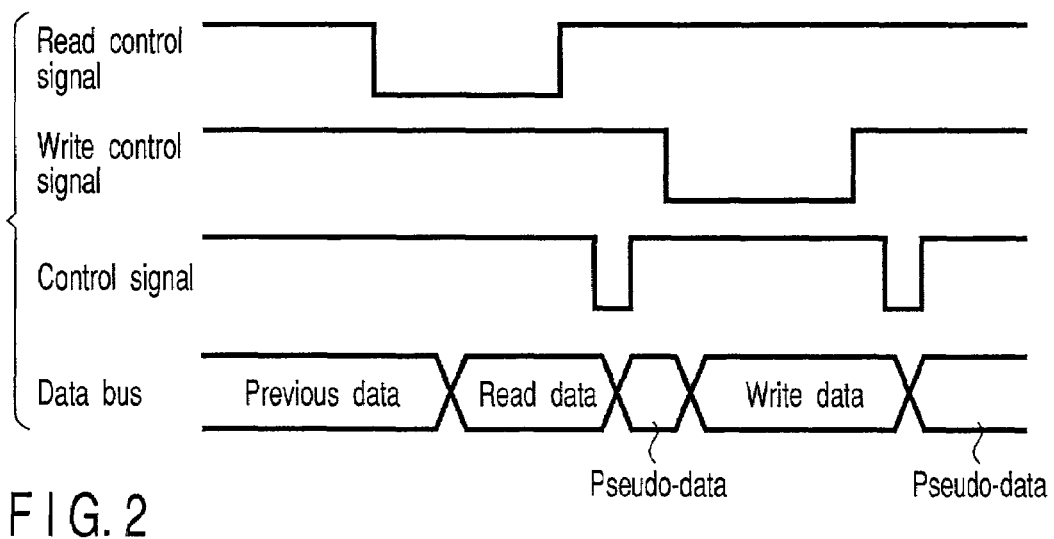
F I G. 2

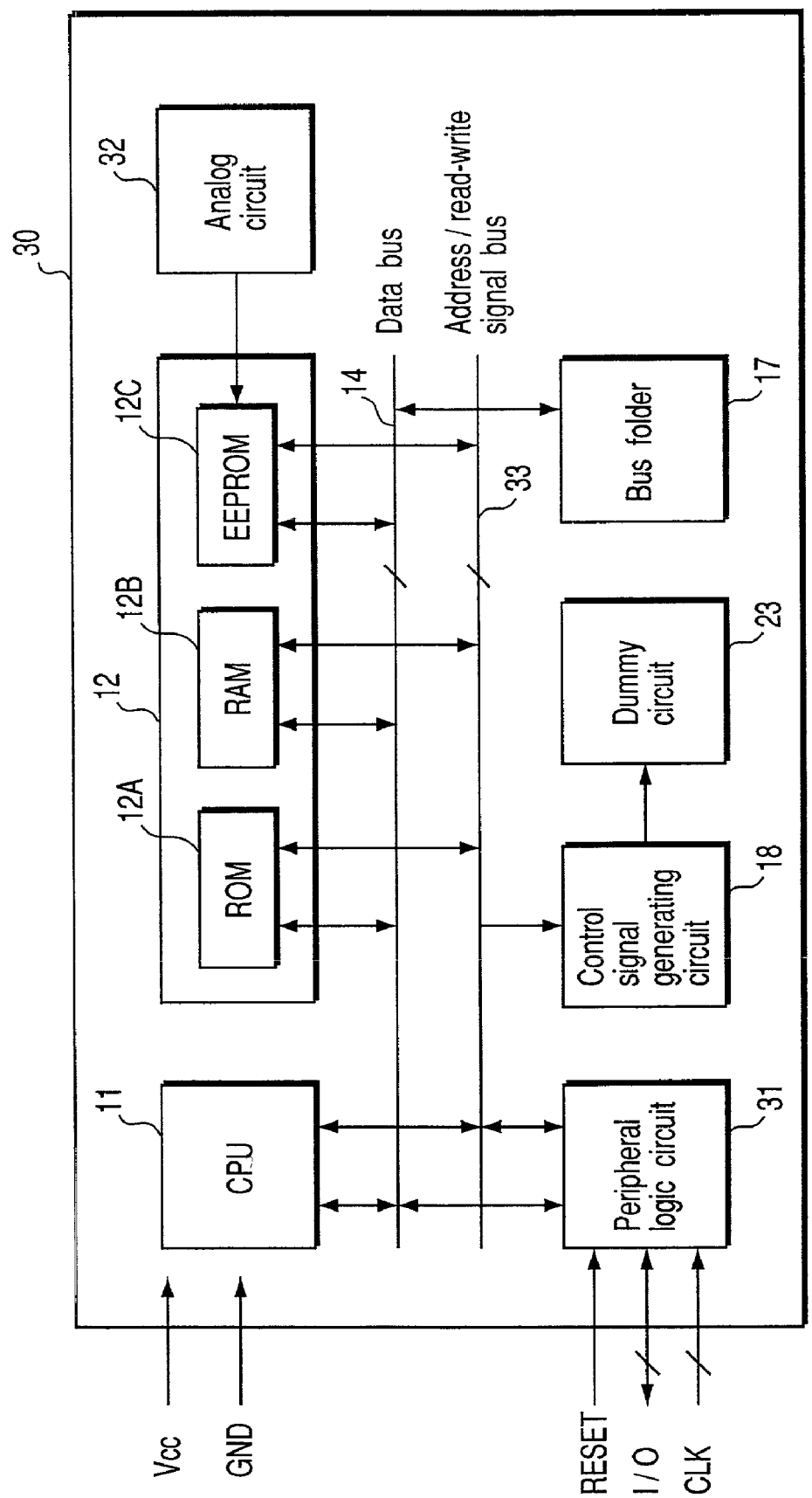
F I G. 8

… …

DATA PROCESSING APPARATUS AND MEMORY CARD USING THE SAME

CROSS-REFERENCE TO RELATED APPLICATIONS

This application is based upon and claims the benefit of priority from the prior Japanese Patent Application No. 2000-400828, filed Dec. 28, 2000, the entire contents of which are incorporated herein by reference.

BACKGROUND OF THE INVENTION

1. Field of the Invention

The invention relates to a data processing apparatus including a CPU and a memory between which data transfer takes place through a data bus, particularly to a memory card, and more particularly to a data processing apparatus adapted to prevent the contents of data to be transferred on the data bus from being externally known.

2. Description of the Related Art

In general, a data processing apparatus such as a memory card internally including a CPU (a central processing unit) makes a slight difference in power consumption by the CPU for the processing of commands according to the type of command and data to be handled by each command. Therefore, the observation of the difference in power consumption as a change in a power current supplied to the data processing apparatus, for example, facilitates the analysis of operation of the CPU.

When the CPU manages and processes secret data in a memory, the secret data may be prone to leak out if the time required for the CPU to process the secret data is determined.

As mentioned above, a conventional data processing apparatus has the risk of the secret data being prone to leak out due to the difference in power consumption.

BRIEF SUMMARY OF THE INVENTION

According to an aspect of the present invention, there is provided a data processing apparatus which comprises: an operation processing unit having at least a read cycle period when the operation processing unit reads data from a device, and a write cycle period when the operation processing unit writes data in the device; a memory which performs data transmission/reception between the operation processing unit and the memory; a data bus connected to the operation processing unit and the memory; and a pseudo-data generating circuit connected to the data bus, the pseudo-data generating circuit generates pseudo-data and outputs the pseudo-data to the data bus in a time interval between the read cycle period and the write cycle period, between the write cycle period and the read cycle period, between two read cycle periods, or between two write cycle periods.

BRIEF DESCRIPTION OF THE SEVERAL VIEWS OF THE DRAWING

FIG. 1 is a block diagram showing the whole configuration of a data processing apparatus according to a first embodiment of the invention;

FIG. 2 is a timing chart showing an example of operation of the data processing apparatus shown in FIG. 1;

FIG. 8 is a block diagram of a memory card to which the data processing apparatus of the second embodiment is applied.

DETAILED DESCRIPTION OF THE INVENTION

Figure 3:
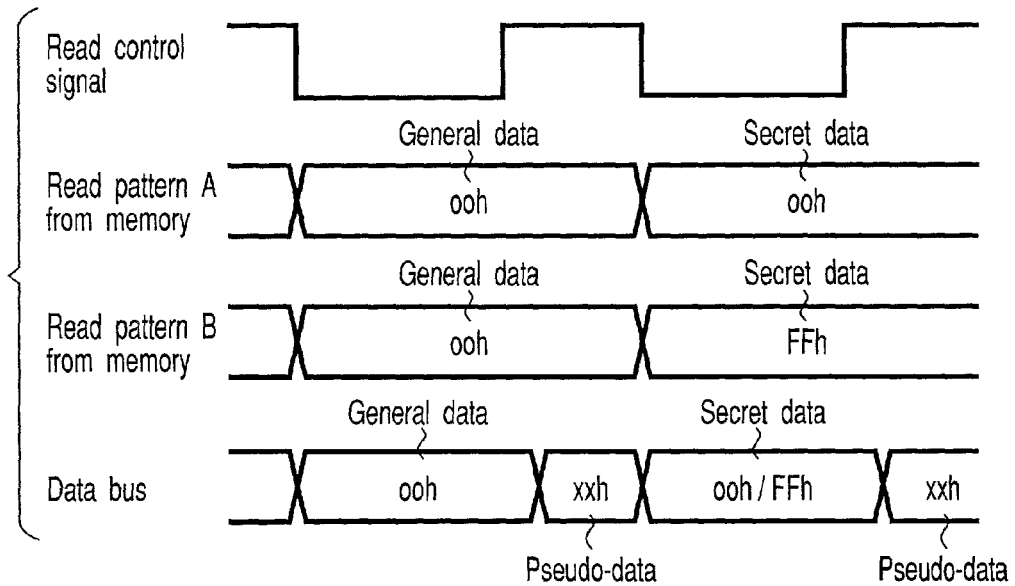
FIG. 3 is a timing chart showing an example of operation of the data processing apparatus shown in FIG. 1, which is different from the example shown in FIG. 2.

Embodiments of the invention will be described in detail below with reference to the drawings.

FIG. 1 is a block diagram showing the whole configuration of a data processing apparatus according to a first embodiment of the invention. In a data processing apparatus 10, a CPU (a central processing unit) 11, a memory 12, an address bus 13, a data bus 14, a read signal line 15, a write signal line 16, a bus folder 17, a control signal generating circuit 18 and a pseudo-data generating circuit 19 are provided.

The CPU 11 performs operation processing based on various types of commands. Data is previously stored in the memory 12, and the data previously stored in the memory 12 is read out and supplied to the CPU 11 in a read cycle period when the CPU 11 performs operation processing. In a write cycle period, data corresponding to the result of operation processing performed by the CPU 11 is supplied to and written in the memory 12.

The CPU 11 and the memory 12 are connected to each other through the address bus 13, the data bus 14, the read signal line 15 and the write signal line 16.

An address to address a memory is transferred to the address bus 13 so that data stored in the memory 12 is read out by the CPU 11 accessing the memory 12 or so that data from the CPU 11 is written in the memory 12.

Data to be transmitted/received between the CPU 11 and the memory 12 is transferred to the data bus 14. Generally, the data bus 14 has a large load capacity, and therefore a bus driving circuit is provided on each of the respective interfaces of the CPU 11 and the memory 12 in order to drive the large load capacity.

A read control signal is transferred to the read signal line 15 in the read cycle period when data stored in the memory 12 is read out by the CPU 11 accessing the memory 12. A write control signal is transferred to the write signal line 16 in the write cycle period when data from the CPU 11 is written in the memory 12 by the CPU 11 accessing the memory 12.

Generally, the bus folder 17 is connected to the data bus 14. The bus folder 17 has a function of temporarily holding data to be transferred on the data bus 14.

The read control signal and the write control signal to be transmitted to the read signal line 15 and the write signal line 16, respectively, are supplied to the control signal generating circuit 18, and the control signal generating circuit 18 detects a change in the read control signal and the write control signal and then generates a control signal. The control signal generated by the control signal generating circuit 18 is supplied to the pseudo-data generating circuit 19. The pseudo-data generating circuit 19 comprises a random number data generating circuit, for example. The pseudo-data generating circuit 19 generates pseudo-data including any random number data in accordance with the above-mentioned control signal and outputs the pseudo-data onto the data bus 14. Since the data bus 14 having the large load capacity is driven by the output from the pseudo-data generating circuit 19, the same bus driving circuit as the bus driving circuits of the CPU 11 and the memory 12 is provided on an interface of the pseudo-data generating circuit 19.

The above-described data processing apparatus 10 also includes a power supply terminal 20 and a ground terminal 21 to which a power supply voltage Vcc and a ground voltage GND are to be supplied, respectively, and a plurality of signal input/output terminals 22 to transmit/receive input and output signals to/from an external apparatus.

Next, the operation of the data processing apparatus having the above-described configuration will be described with reference to a timing chart shown in FIG. 2. The timing chart shown in FIG. 2 shows an example of the case where data from the CPU 11 is written in the memory 12 after data stored in the memory 12 is read out by the CPU 11 accessing the memory 12. In FIG. 2, an initial value of each signal is at "1" level, and each signal is "significant" at "0" level.

First, in the read cycle period, the CPU 11 accesses the memory 12 and the read control signal is lowered to "0" level. In response to this, data is read out from an address in the memory 12 corresponding to an address that is to be outputted from the CPU 11 and transferred on the address bus 13. After that, the data read out from the memory 12 is outputted onto the data bus 14. The data outputted onto the data bus 14 is fetched by the CPU 11 at predetermined timing.

Then, the data read out from the memory 12 is temporarily held by the bus folder 17. The output operation of data from the memory 12 stops after a lapse of predetermined period. In other words, the bus driving circuit provided in the memory 12 stops the output operation of data, and thus the output enters a high impedance state.

The read control signal is lowered to "0" level, then the data on the data bus 14 is fetched by the CPU 11, then the read cycle period ends, and thereafter the control signal generating circuit 18 generates a control signal. The control signal is supplied to the pseudo-data generating circuit 19, which then starts operating and generates random number data. The random number data is outputted onto the data bus 14 as pseudo-data.

After that, the data on the data bus 14 is temporarily held by the bus folder 17 as in the case of the read operation. The output operation of pseudo-data from the pseudo-data generating circuit 19 stops after a lapse of predetermined period. That is, the bus driving circuit provided in the pseudo-data generating circuit 19 stops the output operation of data, and thus the output enters a high impedance state.

Next, in the write cycle period, the write control signal is lowered to "0" level in order to write data in the memory 12. In this case, the CPU 11 outputs the data to be written in the memory 12 onto the address bus 13 to address the memory 12 in which the data is to be written.

After that, the write data outputted from the CPU 11 is written in an addressed location in the memory 12 at predetermined timing.

Then, the write data outputted from the CPU 11 is temporarily held by the bus folder 17. The output operation of data from the CPU 11 stops after a lapse of predetermined period. In other words, the bus driving circuit provided in the CPU 11 stops the output operation of data, and thus the output enters a high impedance state.

The write control signal is lowered to "0" level, then the data is written in the memory 12, then the write cycle period ends, and thereafter the control signal generating circuit 18 generates a control signal as in the case of the previous read operation. The control signal is supplied to the pseudo-data generating circuit 19, which then starts operating and generates random number data. Then, pseudo-data corresponding to the random number data is outputted onto the data bus 14.

After that, the data on the data bus 14 is temporarily held by the bus folder 17 as in the case of the read operation. The output operation of pseudo-data from the pseudo-data generating circuit 19 stops after a lapse of predetermined period. That is, the bus driving circuit provided in the pseudo-data generating circuit 19 stops the output operation of data, and thus the output enters a high impedance state.

As described above, the data processing apparatus shown in FIG. 1 operates in the following manner: that is, during the read cycle period or the write cycle period when original data is transferred between the CPU 11 and the memory 12 through the data bus 14, the pseudo-data generating circuit 19 generates pseudo-data and outputs the pseudo-data onto the data bus 14.

FIG. 3 shows a timing chart showing the operation of the data processing apparatus shown in FIG. 1 in the case where general data and secret data are successively read out from the memory 12.

A read pattern A is that general data of 00h is read out before reading out secret data of 00h, for example (h denotes hexadecimal data). A read pattern B is that secret data of FFh is read out after reading out general data of 00h.

In the case of the read pattern A, the general data and the secret data are the same as each other, and therefore, power consumption by the bus driving circuit provided in the memory 12 changes little at the time of the reading of the secret data. On the other hand, in the case of the read pattern B, all bit data of the general data are different from those of the secret data, and therefore, power consumption by the bus driving circuit provided in the memory 12 changes greatly at the time of the reading of the secret data. In this case, a current change of the power supply voltage is externally observed to examine the correlation between the current change of the power supply voltage at the time of transmission of the general data and the current change of the power supply voltage at the time of transmission of the secret data, and thus the secret data transmitted on the data bus 14 is likely to undergo analysis. Secret data other than the secret data of FFh is read out in the same manner.

In the first embodiment, as shown in FIG. 3, pseudo-data is outputted onto the data bus 14 between the reading of the general data and the reading of the secret data (incidentally, the pseudo-data is indicated by xxh, and xx represents any logical level). Since the pseudo-data is randomly generated, the secret data cannot be known from the correlation even if the correlation between the current change of the power supply voltage at the time of transmission of the pseudo-data and the current change of the power supply voltage at the time of transmission of the secret data is examined. Accordingly, the data processing apparatus of the first embodiment can prevent leakage of secret data.

A data processing apparatus provided with a random number data generating circuit is disclosed in Jpn. Pat. Appln. KOKAI Publication No. 8-249239. Random number data generated by the random number data generating circuit is transferred on a data bus and then fetched by a CPU, and the CPU performs operation processing using the random number data. In the data processing apparatus described in the publication, the random number data is, however, handled as part of normal data and thus transferred to the CPU through the data bus within the read cycle period. In other words, the data processing apparatus described in the publication is different from the data processing apparatus of the above-described embodiment in which pseudo-data is generated and outputted onto the data bus after the read cycle period or the write cycle period. When the random number data is transferred through the data bus within the read cycle period, the random number data is regarded as original data. Consequently, the random number data is correlated with data prior to and subsequent to the random number data, so that the data is analyzed in accordance with the correlation.

In the above-described embodiment, the description is given with regard to the case where the pseudo-data generating circuit 19 generates pseudo-data and outputs the pseudo-data onto the data bus 14 after the read cycle period and the write cycle period when original data is transferred between the CPU 11 and the memory 12 through the data bus 14, or after the read cycle period and the read cycle period. However, the pseudo-data generating circuit 19 may generate pseudo-data and output the pseudo-data onto the data bus 14 between two operation cycle periods forming any of combinations of the read cycle period and the write cycle period when original data is transferred between the CPU 11 and the memory 12 through the data bus 14, namely, between the read cycle period and the write cycle period, between the write cycle period and the read cycle period, between two read cycle periods, or between two write cycle periods.

For example, the description of the operation with reference to FIG. 2 is given using as an example the case where data from the CPU 11 is written in the memory 12 after data stored in the memory 12 is read out by the CPU 11 accessing the memory 12. However, this can be easily inferred also in the case where a plurality of read operations take place in succession as shown in FIG. 3 or the case where a plurality of write operations take place in succession, and therefore the description of these operations is omitted.

Figure 4:
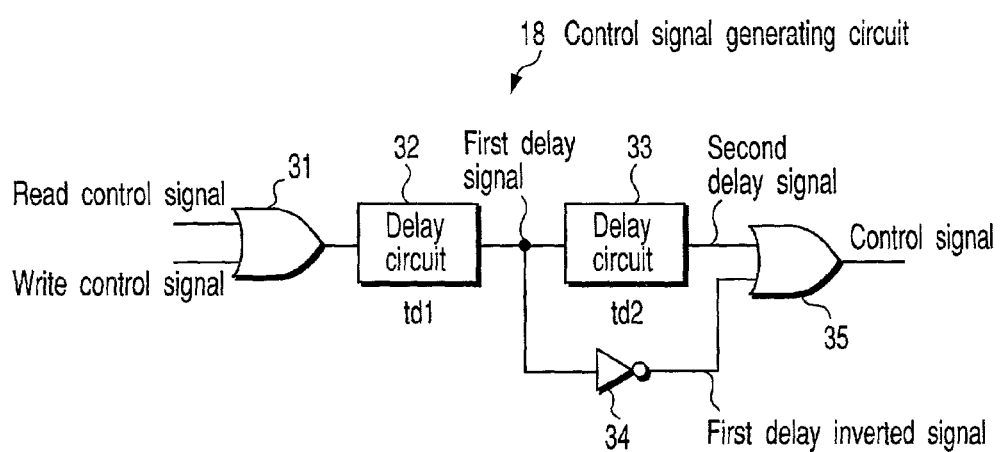
FIG. 4 is a circuit diagram showing an example of a specific configuration of a control signal generating circuit shown in FIG. 1.

FIG. 4 shows an example of a specific circuit configuration of the control signal generating circuit 18 shown in FIG. 1. This circuit includes: an OR circuit 31 to which the read control signal and the write control signal are inputted; a delay circuit 32 which causes the OR circuit 31 to delay outputting the signal for a predetermined period and outputs a first delay signal; a delay circuit 33 which causes the first delay signal to further delay for a predetermined period and outputs a second delay signal; an inverter circuit 34 which inverts the first delay signal and outputs a first delay inverted signal; and an OR circuit 35 to which the second delay signal and the first delay inverted signal are inputted.

Figure 5:
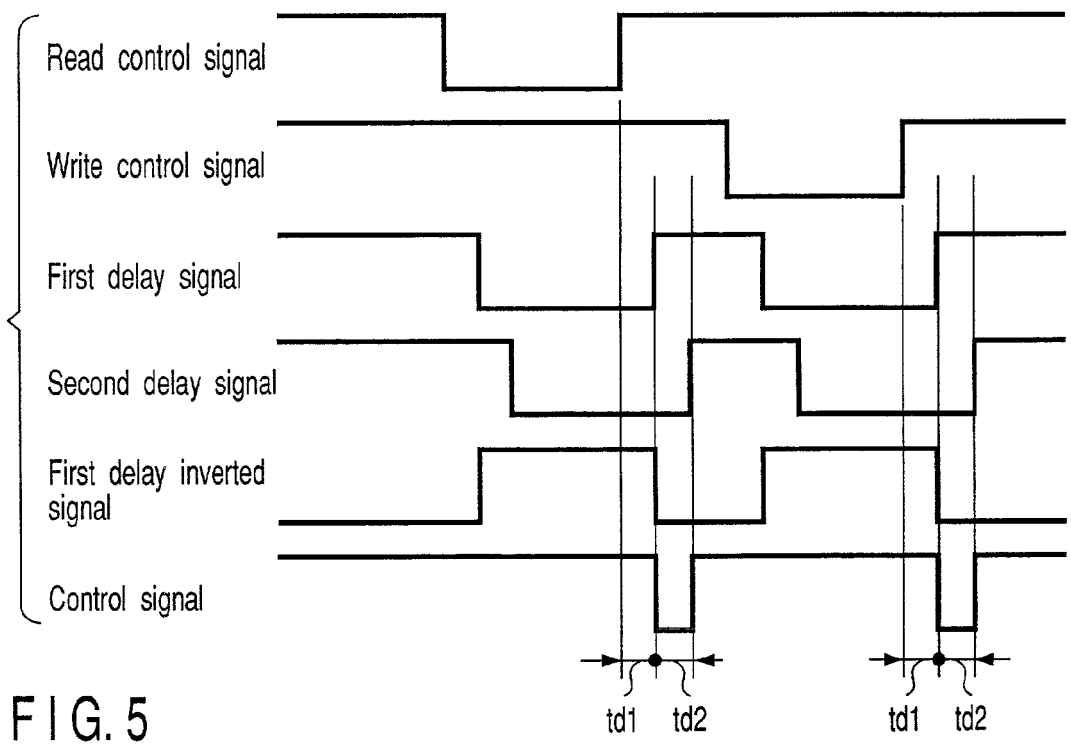
FIG. 5 is a signal waveform chart showing a signal waveform of a principal part of the control signal generating circuit shown in FIG. 4.

FIG. 5 is a timing chart showing a signal waveform of a principal part of the control signal generating circuit 18 shown in FIG. 4. In FIG. 5, td1 and td2 denote the signal delay times of the delay circuits 32 and 33, respectively.

In the read cycle period or the write cycle period, the read control signal or the write control signal drops to "0" level, then the control signal returns to the "1"-level initial value, and thereafter the control signal becomes active after a lapse of the delay time td1 of the delay circuit 32. After that, the control signal becomes inactive after a lapse of the delay time td2 of the delay circuit 33.

Of course, the circuit configuration of the control signal generating circuit 18 is not limited to the circuit configuration shown in FIG. 4. In short, any circuit configuration may be adopted as long as it can detect a change in the read control signal and the write control signal and generate a control signal.

Figure 6:
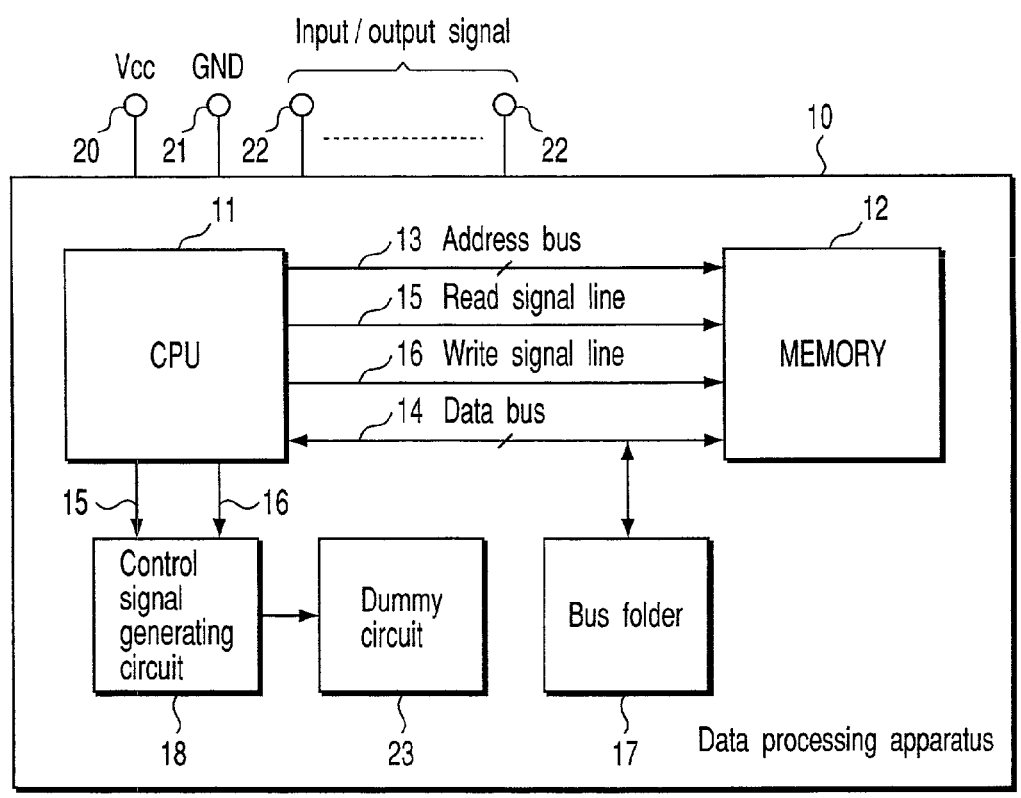
FIG. 6 is a block diagram showing the whole configuration of a data processing apparatus according to a second embodiment of the invention.

FIG. 6 is a block diagram showing the whole configuration of a data processing apparatus according to a second embodiment of the invention.

The data processing apparatus of the second embodiment is different from the data processing apparatus of the above-described first embodiment shown in FIG. 1 in that the pseudo-data generating circuit 19 is replaced by a dummy circuit 23. Therefore, the parts corresponding to the parts shown in FIG. 1 are indicated by the same reference numerals, the description of the corresponding parts is omitted, and the description is given below with regard to only the points of difference between the data processing apparatuses shown in FIGS. 1 and 6.

The dummy circuit 23 is controlled so as to operate in accordance with a control signal generated by the control signal generating circuit 18. When operating, the dummy circuit 23 consumes power to count clock signals. The dummy circuit 23 may include a counter circuit, a shift register or the like, for example.

According to the second embodiment, the dummy circuit 23 operates and consumes power between two operation cycle periods forming any of combinations of the read cycle period and the write cycle period when original data is transmitted/received between the CPU 11 and the memory 12 through the data bus 14, and therefore, power consumption for transfer of two sets of original data including secret data to be transferred between the CPU 11 and the memory 12 is different from power consumption for operation of the dummy circuit 23 during the transfer.

Therefore, the secret data cannot be known from the correlation even if the correlation between a current change of the power supply voltage at the time of operation of the dummy circuit 23 and a current change of the power supply voltage at the time of transmission of the secret data is examined. Accordingly, the data processing apparatus of the second embodiment can also prevent leakage of secret data.

Figure 7:
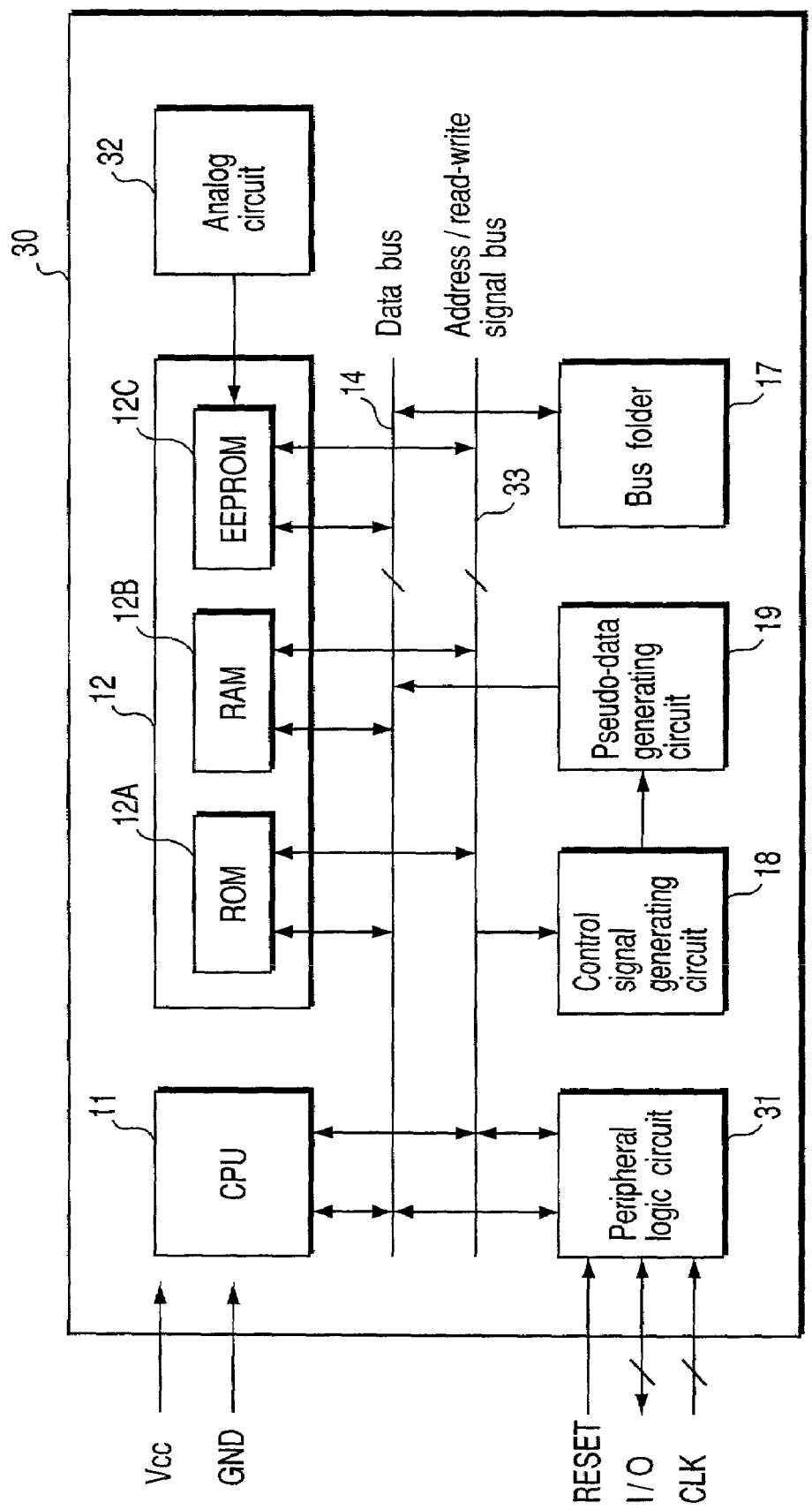
FIG. 7 is a block diagram of a memory card to which the data processing apparatus of the first embodiment is applied.

FIG. 7 is a block diagram showing the whole configuration of a memory card to which the data processing apparatus shown in FIG. 1 is applied. The parts corresponding to the parts shown in FIG. 1 are indicated by the same reference numerals, and the description of the corresponding parts is omitted.

A memory card 30 is internally provided with a peripheral logic circuit 31 and an analog circuit 32, in addition to the CPU 11, the memory 12, the bus folder 17, the control signal generating circuit 18 and the pseudo-data generating circuit 19. In FIG. 7, the address bus 13, the read signal line 15 and the write signal line 16 are shown as one address/read-write signal bus 33 having a predetermined number of bits.

The peripheral logic circuit 31 receives a reset signal RESET and a clock signal CLK inputted from an apparatus provided external to the memory card 30, supplies the signals to each circuit in the memory card 30, and performs data transfer between the external apparatus and the internal data bus 14 through an external I/O.

The above-mentioned memory 12 includes, for example, a ROM 12A, a RAM 12B and an EEPROM 12C as shown in FIG. 7.

The analog circuit 32 generates various types of voltages required for the EEPROM 12C in the memory 12 to operate by an external power supply voltage Vcc, and supplies the voltages to the EEPROM 12C. The abovementioned secret data is previously stored in the EEPROM 12C, for example.

In the memory card having the above-described configuration, general data is read out from the ROM 12A, the RAM 12B or the EEPROM 12C, and thereafter, when the secret data previously stored in the EEPROM 12C is read out, pseudo-data is outputted onto the data bus 14 between the read cycle period of the general data and the read cycle period of the secret data. Therefore, the memory card can achieve the effect of preventing leakage of secret data as in the case of the above-described first embodiment.

FIG. 8 is a block diagram showing the whole configuration of a memory card to which the data processing apparatus shown in FIG. 6 is applied. The parts corresponding to the parts shown in FIG. 6 are indicated by the same reference numerals, and the description of the corresponding parts is omitted.

The memory card 30 is internally provided with the peripheral logic circuit 31 and the analog circuit 32, in addition to the CPU 11, the memory 12, the bus folder 17, the control signal generating circuit 18 and the dummy circuit 23. Also in this case, in FIG. 8, the address bus 13, the read signal line 15 and the write signal line 16 are shown as one address/read-write signal bus 33 having a predetermined number of bits.

In the same manner as the peripheral logic circuit 31 shown in FIG. 7, the peripheral logic circuit 31 receives the reset signal RESET and the clock signal CLK inputted from the apparatus provided external to the memory card 30, supplies the signals to each circuit in the memory card 30, and performs data transmitted/received between the external apparatus and the internal data bus 14 through the external I/O.

The above-mentioned memory 12 includes, for example, the ROM 12A, the RAM 12B and the EEPROM 12C in the same manner as the memory 12 shown in FIG. 7.

The analog circuit 32 generates various types of voltages required for the EEPROM 12C to operate by the external power supply voltage Vcc in the same manner as the analog circuit 32 shown in FIG. 7.

In the memory card having the above-described configuration, general data is read out from the ROM 12A, the RAM 12B or the EEPROM 12C, and thereafter, when the secret data previously stored in the EEPROM 12C is read out, the dummy circuit 23 operates and consumes power between the read cycle period of the general data and the read cycle period of the secret data. Therefore, the memory card can achieve the effect of preventing leakage of secret data as in the case of the above-described second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus comprising:
an operation processing unit connected to a data bus and configured to perform a read cycle by outputting a read control signal to a memory to read a read data word output by said memory to said data bus, and a write cycle by outputting a write control signal to said memory and a write data word to said data bus to write said write data word in the memory; and
a pseudo-data generating circuit connected to said data bus, said read control signal output from said operation processing unit, and said write control signal output from said operation processing unit, said pseudo-data generating circuit configured to generate pseudo-data and output the generated pseudo-data to said data bus according to an output timing based on said read control signal and said write control signal output from said operation processing unit,
the output timing controlled to cause the pseudo-data generating circuit to output the generated pseudo-data between a read cycle and an immediately following write cycle, between a write cycle and an immediately following read cycle, between a read cycle and an immediately following read cycle, or between a write cycle and an immediately following write cycle, and
the output timing controlled to prevent the pseudo-data generating circuit from outputting the generated pseudo-data during the read cycle and the immediately following write cycle, during the write cycle and the immediately following read cycle, during the read cycle and the immediately following read cycle, or during the write cycle and the immediately following write cycle.

2. The data processing apparatus according to claim 1, wherein said pseudo-data generating circuit generates random number data as the pseudo-data.

3. The apparatus of claim 1, wherein:
the operation processing unit is further configured to output the read control signal to have an active read control time period and an inactive read control time period, and output the write control signal to have an active write control time period and an inactive write control time period, and
the pseudo-data generating circuit is further configured to control the output timing of the generated pseudo-data to prevent the output of the generated pseudo-data to the data bus during at least one of the active read control time period and the active write control time period.

4. The apparatus of claim 3, wherein:
the pseudo-data generating circuit is further configured to control the output timing of the generated pseudo-data to be delayed by a predetermined time from at least one of the active read control time period and the active write control time period.

5. The apparatus of claim 4, wherein the predetermined time period is shorter than the active read control time period or the active write control time period.

6. A data processing apparatus comprising:
an operation processing unit configured to perform an operation processing and output a read signal and a write signal;
a data bus connected to said operation processing unit;
a memory configured to receive the read signal and the write signal from the operation processing unit and configured to output a read data on the data bus in response to the read signal, and store a write data from the data bus in response to the write signal;
a control signal generating circuit configured to receive said read signal and said write signal from the operation processing unit, detect a change in the read signal and a change in the write signal, and generate a control signal based on the detected change; and
a pseudo-data generating circuit connected to said data bus and configured to receive the control signal from the control signal generating circuit, generate pseudo-data, and output the generated pseudo-data to said data bus in accordance with a timing of the control signal.

7. The data processing apparatus according to claim 6, wherein said pseudo-data generating circuit generates random number data as the pseudo-data.

8. The apparatus of claim 6, wherein:
the operation processing unit is further configured to output the read signal to have an active read signal time period and an inactive read signal time period, and output the write signal to have an active write signal time period and an inactive write signal time period, and
the control signal generating circuit is further configured to control an output timing of the control signal to prevent the output of the generated pseudo-data to the data bus during at least one of the active read signal time period and the active write signal time period.

9. The apparatus of claim 8, wherein:
the control signal generating circuit is further configured to control the output timing of the control signal to delay the output of the generated pseudo-data by a predetermined time from at least one of the active read signal time period and the active write signal time period.

10. The apparatus of claim 9, wherein the predetermined time period is shorter than the active read control time period or the active write control time period.

11. A memory card comprising:
an operation processing unit connected to a data bus and configured to perform a read cycle by outputting a read control signal to a memory to read a read data word output by said memory to said data bus, and a write cycle by outputting a write control signal to said memory and a write data word to said data bus to write said write data word in the memory;
an input/output circuit connected to said data bus, said input/output circuit configured to input external data onto said data bus and output data on said data bus to an external apparatus; and
a pseudo-data generating circuit connected to said data bus, said read control signal output from said operation processing unit, and said write control signal output from said operation processing unit, said pseudo-data generating circuit configured to generate pseudo-data and output the generated pseudo-data to said data bus according to an output timing based on said read control signal and said write control signal output from said operation processing unit,
the output timing controlled to cause the pseudo-data generating circuit to output the generated pseudo-data between a read cycle and an immediately following write cycle, between a write cycle and an immediately following read cycle, between a read cycle and an immediately following read cycle, or between a write cycle and an immediately following write cycle, and
the output timing controlled to prevent the pseudo-data generating circuit from outputting the generated pseudo-data during the read cycle and the immediately following write cycle, during the write cycle and the immediately following read cycle, during the read cycle and the immediately following read cycle, or during the write cycle and the immediately following write cycle.

12. The memory card according to claim 11, wherein said pseudo-data generating circuit generates random number data as the pseudo-data.

13. The memory card of claim 11, wherein:
the operation processing unit is further configured to output the read control signal to have an active read control time period and an inactive read control time period, and output the write control signal to have an active write control time period and an inactive write control time period, and
the pseudo-data generating circuit is further configured to control the output timing of the generated pseudo-data to prevent the output of the generated pseudo-data to the data bus during at least one of the active read control time period and the active write control time period.

14. The memory card of claim 13, wherein:
the pseudo-data generating circuit is further configured to control the output timing of the generated pseudo-data to be delayed by a predetermined time from at least one of the active read control time period and the active write control time period.

15. The memory of claim 14, wherein the predetermined time period is shorter than the active read control time period or the active write control time period.

16. A memory card comprising:
an operation processing unit configured to perform an operation processing and output a read signal and a write signal;
a data bus connected to said operation processing unit;
an input/output circuit connected to said data bus, said input/output circuit configured to input external data onto said data bus and output data on said data bus to an external apparatus;
a memory configured to receive the read signal and the write signal from the operation processing unit and configured to output a read data on the data bus in response to the read signal, and store a write data from the data bus in response to the write signal;
a control signal generating circuit configured to receive said read signal and said write signal from the operation processing unit, detect a change in the read signal and a change in the write signal, and generate a control signal based on the detected change; and
a pseudo-data generating circuit connected to said data bus and configured to receive the control signal from the control signal generating circuit, generate pseudo-data, and output the generated pseudo-data to said data bus in accordance with a timing of the control signal.

17. The memory card according to claim 16, wherein said pseudo-data generating circuit generates random number data as the pseudo-data.

18. The memory card of claim 16, wherein:
the operation processing unit is further configured to output the read signal to have an active read signal time period and an inactive read signal time period, and output the write signal to have an active write signal time period and an inactive write signal time period, and
the control signal generating circuit is further configured to control an output timing of the control signal to prevent the output of the generated pseudo-data to the data bus during at least one of the active read signal time period and the active write signal time period.

19. The memory card of claim 18, wherein:
the control signal generating circuit is further configured to control the output timing of the control signal to delay the output of the generated pseudo-data by a predetermined time from at least one of the active read signal time period and the active write signal time period.

20. The memory of claim 19, wherein the predetermined time period is shorter than the active read control time period or the active write control time period.

21. A data processing apparatus comprising:
an operation processing unit connected to a data bus and configured to perform a read cycle by outputting a read control signal to a memory to read a read data word output by said memory to said data bus, and a write cycle by outputting a write control signal to said memory and a write data word to said data bus to write said write data word in the memory; and
a dummy circuit connected to said data bus, said read control signal output from said operation processing unit, and said write control signal output from said operation processing unit, said dummy circuit configured to consume power and not consume power according to an output timing based on said read control signal and said write control signal output from said operation processing unit, the output timing controlled to cause the dummy circuit to consume power between a read cycle and an immediately following write cycle, between a write cycle and an immediately following read cycle, between a read cycle and an immediately following read cycle, or between a write cycle and an immediately following write cycle, and the output timing controlled to cause the dummy circuit not to consume power during the read cycle and the immediately following write cycle, during the write cycle and the immediately following read cycle, during the read cycle and the immediately following read cycle, or during the write cycle and the immediately following write cycle.

22. A data processing apparatus comprising:

an operation processing unit configured to perform an operation processing and output a read signal and a write signal;

a data bus connected to said operation processing unit;

a memory configured to receive the read signal and the write signal from the operation processing unit and configured to output a read data on the data bus in response to the read signal, and store a write data from the data bus in response to the write signal;

a control signal generating circuit configured to receive said read signal and said write signal from the operation processing unit, detect a change in the read signal anda change in the write signal, and generate a control signal based on the detected change; and a dummy circuit connected to said data bus and configured to receive the control signal from the control signal generating circuit, consume power, and not consume power in accordance with a timing of the control signal.

* * * * *